United States Patent Office 3,718,613
Patented Feb. 27, 1973

3,718,613
POLYURETHANE FOAM RETICULATED BY
FIRE-POLISHING METHOD
Marvin T. Conger and Theodore A. Evans, Akron, Ohio, assignors to The Goodyear Tire & Rubber Company, Akron, Ohio
No Drawing. Continuation-in-part of application Ser. No. 784,188, Dec. 16, 1968. This application Oct. 26, 1970, Ser. No. 84,167
Int. Cl. C08g 22/44, 22/08
U.S. Cl. 260—2.5 BD         4 Claims

ABSTRACT OF THE DISCLOSURE

A reticulated foam made by fire polishing a cellular product made by reacting a mixture of a hydrocarbon polyol of 500 to 10,000 molecular weight, an organic polyisocyanate, and a blowing agent, where the blowing agent may be water or other low boiling substances.

This application is a continuation-in-part of application Ser. No. 784,188, filed Dec. 16, 1968 now abandoned.

This invention relates to a novel class of reticulated polyurethane foams and to a process for their production.

Although reticulated polyester and polyether urethane foams have achieved some commercial acceptability, these materials have certain disabilities, namely, the polyester urethanes tend to be readily hydrolized and are attacked and destroyed by microbiological organisms. The polyethers tend to have relatively high solubility in certain solvents. Therefore, it is desirable to provide a new class of reticulated polyurethane foams which have different chemical and solvent characteristics and which exhibit improved resistance to microbiological attack.

This new class of polyurethane reticulated foams can be prepared by reacting an organic polyisocyanate with a hydrocarbon polyol of about 500 to 10,000 molecular weight and preferably 700 to 4000 molecular weight in the presence of a blowing agent such as water, a low boiling or gas generating agent or combinations of these, either with or without various polyurethane catalysts. Then the foam is reticulated by subjecting the foam to a flame front or fire polishing to remove the thin diaphragm covering of the windows of the individual cells and cause thickening of the cell walls as the foam passes through a state approximating its thermoplastic or flow temperature.

The nature of this invention may more readily be understood by reference to the following examples wherein all parts are by weight unless otherwise indicated.

EXAMPLE I

One hundred thousand parts by weight of a hydroxyl terminated copolymer of butadiene and acrylonitrile of about 2000 molecular weight where the butadiene content is approximately 85 percent and the acrylonitrile content is approximately 15 percent containing 3000 parts of water, 270 parts of dibutyl tin dilaurate, 90 parts of 2-dimethylamine-2-methyl-1-propanol and 25 parts of silicone y and 200 parts of Silicone L–520 were mixed in a suitable one-shot foam apparatus (an Admiral Foam machine) with 35,000 parts of a commercial toluene diisocyanate (80/20 isomeric mixture) and allowed to foam in a cubic shaped mold of about 1 cubic foot to form a foam having a density of about 2 pounds per cubic foot. A specimen of this cured foam was placed within a suitable retaining mold and the pores or cells thereof filled with a mixture of approximately 20 percent propane and 80 percent oxygen. Then the mold was closed and the propane-oxygen mixture was ignited by passing a current from a 10,000-volt spark generator through an automobile spark plug projecting within the mold. The resulting explosion reticulated or fire polished the foam to give a foam bun having approximately 5 pores per inch. In other cases foams were successfully reticulated containing up to 100 pores per inch. This reticulated foam had an orange color and a density of approximately 2 pounds per cubic foot, a tensile strength of approximately 12 to 14 pounds per square inch and an ultimate elongation of approximately 150 to 160 percent and a tear resistance of 5 pounds per inch.

Silicone L–520 is a blocked silicone oxyalkylene copolymer where the hydrocarbon radicals of the blocks are oxyethylene and oxypropylene containing 15 to 19 oxyethylene and 11 to 15 oxypropylene units. Silicone y is a polyoxyalkylene silicone where the alkylene radical is propylene.

EXAMPLE II

Other foams were made with the recipe shown for Runs A to D, in Table 1:

TABLE 1

| Run numbers | A | B | C | D |
|---|---|---|---|---|
| Polybutadiene diol | 100 | 100 | 100 | 100 |
| Water | 3 | 3 | 3 | 3 |
| Dibutyltin dilaurate | 0.26 | 0.33 | 0.33 | 0.33 |
| 2-dimethylamino-2-methyl-1-propanol | 0.44 | 0.44 | 0.42 | 0.44 |
| Silicone y | 0.025 | 0.05 | 0.05 | 0.05 |
| Silicone L–520 | 0.20 | 0.23 | 0.28 | 0.25 |
| Toluene diisocyanate (80/20 isomers) | 38 | 38 | 38 | 38 |

The foam from Run A had relatively large cells, while the foam from Run B had cells of approximately the same average size except some smaller cells were intermixed with the larger cells. The foams of Runs C and D had very noticeable windows covering the cells. Instead of polybutadiene diol, the polyisoprene diols can be used to make foams, too.

EXAMPLE III

A polybutadiene diol having a hydroxyl content of 0.80 milli-equivalents per gram was used in this example. The toluene diisocyanate content was run at 38 and 28 grams per 100 grams of polybutadiene diol.

Other foams were made by the one-shot method although the prepolymer or other well-known methods could be used with appropriate adjustment of the catalyst and blowing agent ratios. For instance, in Example II a polybutadiene diol having a hydroxyl content of 0.75 milli-equivalents per gram was used as the resin and the ingredients were mixed and foamed according to the one-shot technique. The resulting foams had varying cell size with noticeable windows or thin films covering the cells.

A crude methane diphenyl diisocyanate, about 60 parts per 100 parts of the polybutadiene diol, was used instead of toluene diisocyanate to make a satisfactory foam with the above polyols. Other organic polyisocyanates can be used, too.

Any organic polyisocyanate or mixtures of polyisocyanates may be employed in preparing the cellular polyurethane products. The amount of polyisocyanate employed should be at least sufficient to crosslink the active-hydrogen-containing polymeric material and to react with the water present to generate carbon dioxide gas so generated causes the liquid reaction mixture to foam and form cellular products. In general, it is preferred to use from 2 to 8 equivalents of isocyanate per mol of polymeric material with best results being obtained by the use of approximately 3 mols of a diisocyanate per mole of polymeric material. Representative examples of polyisocyanates which may be employed are the diisocyanates such as hexamethylene diisocyanate; paraphenylene diisocyanate; meta-phenylene diisocyanate; 4,4'-diphenylene diisocyanate; 1,5-naphthalene diisocyanate; 4,4'-diphenylene methane diisocyanate; the tolylene diisocyanates; 4,4'-diphenyl ether diisocyanate; 3,3'-dimethyl 4,4'-diphenyl diisocyanate; and 3,3'-dimethoxy 4,4'-diphenyl diisocyanate; the triisocyanates such as 4,4',4''-triphenyl methane diisocyanate; and toluene 2,4,6-triisocyanate; the tetraisocyanates such as 4,4'-dimethyldiphenyl methane 2,2',5,5'-tetraisocyanate and mixtures of polyisocyanates. Of these the liquid tolylene diisocyanates, such as 2,4 tolylene diisocyanate and 2,6 tolylene diisocyanate or mixtures thereof and toluene 2,4,6-triisocyanate are particularly preferred.

EXAMPLE IV

A copolymer containing approximately 75 percent butadiene and approximately 25 percent styrene and having a hydroxyl content of 0.75 milli-equivalent per gram (designated hereinafter as Resin CS–15) was used to prepare a foam according to recipes shown below by the one-shot technique.

TABLE 2

| Run numbers | E | F |
| --- | --- | --- |
| Resin CS-15 | 100 | 100 |
| Water | 3 | 3 |
| Dibutyltin dilaurate | 0.40 | 0.51 |
| 2-dimethylamine-2-methyl-1-propanol | 0.44 | 0.42 |
| Silicone y | 0.03 | 0.03 |
| Silicone L-520 | 0.20 | 0.23 |
| Toluene diisocyanate (80/20 isomers) | 38 | 28 |

The hydrocarbon diols or polyols of 2 to 5 hydroxyls useful in this invention in general are prepared by polymerizing an olefin such as a conjugated diolefin alone or in conjunction with an alpha olefin to give a polymer which is then hydroxyl terminated. Representative examples of these olefins are ethylene, propylene, butylene, amylene, hexylene, styrene, acrylonitrile and related aliphatic and aromatic olefins of about 2 to 20 carbon atoms, with those of 2 to 12 being the more desirable ones. The conjugated diolefins are represented by butadiene, isoprene, piperylene, ethyl butadiene and the other well-known conjugated diolefins having from 4 to 12 carbon atoms.

The polymerization of the olefins may be achieved with an alkali metal such as lithium or organo-alkali compounds and then the hydroxyl group is introduced by removal of the alkali metal with water, formaldehyde, ethylene oxide and other agents well-known to the art. It should be indicated that the degree of saturation or unsaturation can be controlled by hydrogenation.

The foams prepared in Examples 2 to 4, as well as the polyisoprene diol prepared foam, were reticulated according to the technique described in Example 1 and the resulting foams were found to be equivalent in physical characteristics to the commercial reticulated polyester urethane foams and superior thereto in their resistance to hydrolysis and microbiological attack.

The amount of blowing agent used is controlled normally by the density desired in the finished foam. For instance, the water can vary from 0.5 to about 5 or 6 parts per hundred. The blowing agents such as the fluorinated hydrocarbons and methylene chloride can be used in equivalent amounts to vary the foam density.

Reticulated foam is used within this specification to indicate a foam which has been fire polished to destroy the membranes or thin films joining the strands which divide contiguous cells without destroying the strands of the skeletal structure.

Reticulated foams of this invention are particularly useful as a filler or packing in fuel tanks to reduce the slushing of the fuel and hydraulic hammer as the plane is maneuvered. Also, the use of reticulated foams of this sort in fuel tanks is particularly desirable where the fuel tanks are used in racing cars. Normally, reticulated foams for use in fuel tanks are required to pass the military specification commonly referred to as MIL–B–83054 (USAF). A reticulated foam meeting the aforesaid military specification would have the properties set forth in Table 1 thereof as follows:

TABLE 1.—PROPERTIES AND REQUIREMENTS

| Property | Requirement | Test method |
| --- | --- | --- |
| 1. Color | Orange | 4.7.1 |
| 2. Density | 2.1 lb./ft.$^3$ (maximum) | 4.7.2 |
| 3. Pores per inch | 10 (+5, −3) p.s.i. | 4.7.3 |
| 4. Tensile strength | 15 p.s.i. (minimum) | 4.7.4 |
| 5. Tensile strength at 200% elongation | 10 p.s.i. (minimum) | 4.7.4 |
| 6. Ultimate elongation | 250% (minimum) | 4.7.4 |
| 7. Tear resistance | 5 pounds per inch (minimum) | 4.7.5 |
| 8. Constant deflection compression set (50% deflection) | 30% (maximum) | 4.7.6 |
| 9. Compression load deflection: | | |
| (b) 25% deflection | 0.5 p.s.i. (minimum) | 4.7.7 |
| (c) 50% deflection | As determined | |

For instance, a reticulated foam made using a hydroxyl terminated polyacrylonitrile-butadiene copolymer, approximately 85/15 percent blend, with toluene diisocyanate readily passes the above referred-to military specification, whereas reticulated polyether foams do not have strength sufficient to pass this military specification.

While certain representative embodiments and details have been shown for the purpose of illustrating the invention, it will be apparent to those skilled in this art that various changes and modifications may be made therein without departing from the spirit or scope of the invention.

What is claimed is:

1. A reticulated foam prepared by reacting in a first step a hydrocarbon polyol of 500 to 10,000 molecular weight and an organic polyisocyanate in the presence of a blowing agent and then fire polishing said reaction product in a second step to give a foam having a density of 2.1 pounds per cubic foot maximum, 7.15 pores per inch, tensile strengths of 15 p.s.i. minimum, tensile strength at 200% elongation of 10 p.s.i. minimum, an ultimate elongation of 250% minimum, a tear resistance of 5 pounds per inch minimum and a constant deflection under load of 30% maximum.

2. The reticulated foam of claim 1 wherein the hydrocarbon polyol is the product obtained by hydroxyl termination of the copolymer of an olefin having from 2 to 20 carbon atoms to give essentially a hydroxyl polyol of 2 to 5 hydroxyls.

3. The reticulated foam of claim 2 wherein the hydrocarbon polyol is essentially a diol.

4. The reticulated foam of claim 1 wherein the hydrocarbon polyol is a hydroxyl terminated polybutadiene acrylonitrile.

References Cited

UNITED STATES PATENTS

| | | | |
| --- | --- | --- | --- |
| 2,921,039 | 1/1960 | McKay et al. | 260—2.5 |
| 3,284,415 | 11/1966 | Horvath | 260—77.5 |
| 3,325,338 | 6/1967 | Geen | 161—89 |
| 3,551,472 | 12/1970 | Siebert | 260—465.4 |
| 3,171,820 | 3/1965 | Volz | 260—2.5 |
| 3,446,779 | 5/1969 | Finelli et al. | 260—75 |
| 3,503,932 | 3/1970 | Reuter | 260—75 |
| 3,175,025 | 3/1965 | Geen et al. | |
| 3,248,773 | 4/1966 | Barringer | 260—77.5 |

OTHER REFERENCES

Military Specification, MIL–B–83054 (USAF) 26 June 1968, pp. 1–15.

"Poly B–D," Product Data Bulletin No. 505, Sinclair Petrochemicals Inc. (N.Y.) May 1965, 7 pp.

DONALD E. CZAJA, Primary Examiner

H. S. COCKERAM, Assistant Examiner

U.S. Cl. X.R.

260—2.5 AM, 77.5 AP, 77.5 CR